Oct. 17, 1967 G. R. GAULD 3,348,167
RELAXATION OSCILLATOR REQUIRING LOW CURRENT
Filed April 20, 1966
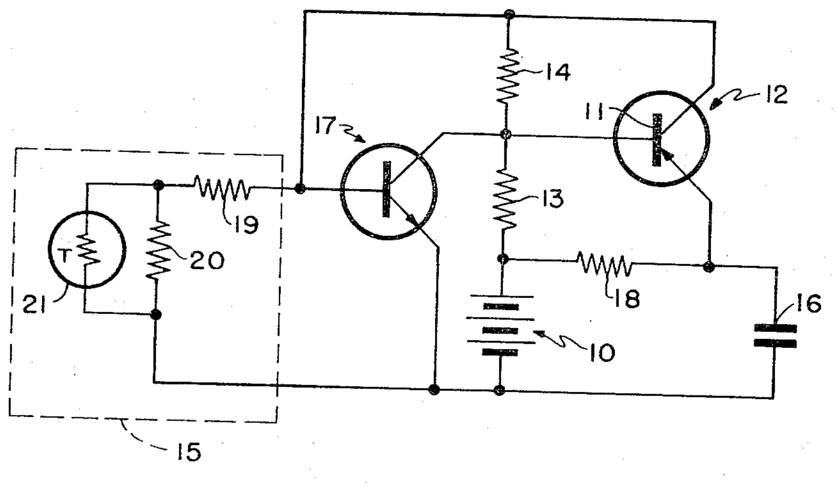
INVENTOR.
GODFREY R. GAULD
BY Alden W. Redfield
Charles M. Hogan
ATTORNEYS.

United States Patent Office 3,348,167
Patented Oct. 17, 1967

3,348,167
RELAXATION OSCILLATOR REQUIRING LOW CURRENT

Godfrey R. Gauld, Richmond, Ind., assignor to Avco Corporation, Richmond, Ind., a corporation of Delaware Filed Apr. 20, 1966, Ser. No. 543,997
4 Claims. (Cl. 331—111)

ABSTRACT OF THE DISCLOSURE

This is a low current relaxation oscillator. Across a current source there is connected a chain of four resistances providing points of connection. A pair of transistors of opposite conductivity types are regeneratively related, the collector of each being connected to the base of the other. A time constant energy storage circuit is coupled to that source, the emitter of one of the transistors being connected to the junction of the resistance and capacitance. The two connecting points on the voltage divider are connected, respectively, to the base of that transistor and the base of the other transistor. Two of the resistors in the series chain are connected between the base and the emitter of the other transistor for stabilizing purposes.

The present invention relates to transistorized relaxation oscillators.

The principal object of the invention is to provide a cascaded combination of two transistors of opposite conductivity types, which transistors are mutually in positive feedback relationship and normally in the non-conducting condition. While relaxation oscillator devices normally operate not only in teeter-totter fashion, but in such a way that one or the other active device draws heavy current from the supply at any given time, the object of the present invention is to provide an arrangement in which neither active device draws heavy current from the supply.

Another object of the invention is to provide a transistorized relaxation oscillator which has an adjustable threshold voltage and is readily temperature-stabilized.

The single figure of the drawing is a circuit schematic of a preferred form of the invention.

The invention as here illustrated provides a novel arrangement of cascaded transistors 17 and 12. Advantage is taken of the symmetry of transistors such as the NPN type transistor 17 and the PNP type transistor 12 to provide a circuit in which positive feedback is generated in the two transistors, both of which are normally in the non-conducting condition. From the statement of objects, it will be understood that the advantages of this arrangement are: (1) that it draws very low current; (2) that it has an adjustable threshold voltage; and (3) that it can readily be temperature-compensated. A battery 10 is connected in series with a resistor 13, a resistor 14, and an equivalent resistor 15 in such manner that these constitute a source of current and a voltage divider. The equivalent resistor 15 comprises a series resistor 19, a series resistor 20, and a shunt thermistor 21 (in shunt with 20) arranged in the base-emitter circuit of common-emitter arranged transistor 17, the ground side being connected to the emitter of transistor 17, and resistor 19 being connected in series with the base of transistor 17. Transistors 17 and 12 are so connected that the collector current of 17 flows through the base-emitter junction of 12. Accordingly, there is a direct connection from the collector of 17 and to the first intermediate potential tap on the voltage divider to the base of 12. Similarly, the collector current of transistor 12 flows through the base-emitter junction of transistor 17. Therefore the collector of 12 is connected to the second intermediate tap on the voltage divider and the base of 17.

In order to provide an initial reverse bias on the second transistor 12, its base is connected to the junction of resistors 13 and 14, and its emitter is connected via resistor 18 to the positive terminal of battery 10—i.e., the junction between battery 10 and resistor 13. Resistor 18 is a portion of a resistance-capacitance energy storage network across battery 10, which network comprises resistor 18 and capacitor 16. Because of the current-gain properties of transistors, the loop gain of the cascaded transistors 17, 12 here involved is less than unity until a minimum current is reached. After that current is reached, a runaway condition obtains. The current necessary to produce runaway flows through the base-emitter junction of transistor 12 as soon as a threshold voltage which is effectively established by the voltage divider has been exceeded.

The resistor 18 and the capacitor 16 are a charging circuit. The threshold voltage is determined by the voltage divider 13–15 and by the forward voltage drop across the emitter-base junction of transistor 12. When the voltage across the capacitor 16 exceeds this threshold, current begins to flow through the emitter-base junction of transistor 12. This current is amplified by the gain of the transistor and produces a current in the base-emitter junction of transistor 17. This current is amplified by the gain of the transistor 17, and the resulting low impedance of transistor 17 reduces the threshold and tends to increase the emitter-base current of transistor 12. The effect is cumulative and results in the almost complete discharge of capacitor 16. When capacitor 16 is discharged, the currents in transistors 17 and 12 virtually cease, and the threshold returns to its original value and capacitor 16 begins to recharge.

By using the voltage divider and the forward-biased junction to determine the threshold voltage, it becomes possible to adjust the threshold and to compensate, by means of thermistors and semiconductor junctions, for temperature variations. The use of cascaded transistors 17, 12 to perform the discharge of the capacitor 16 results in a variable threshold detector sensitivity, which can readily be compensated for temperature by using the thermistor 21, high output pulses through the load, and extremely low current drain on the power source 10.

Existing techniques for performing this same function can be divided into two classes: high voltage and low voltage. High voltage circuits utilize the breakdown properties of gas tubes, while the low voltage circuits depend upon the properties of unijunction transistors or of four-layer diodes. It is in the low voltage range in which the invention has principal application. It has the advantage over four-layer diodes in being able to operate at lower voltages and being readily amenable to compensation for temperature. It has the advantages of unijunction circuits in that it requires fewer components and draws much less current.

The invention has numerous applications. It was initially used as a generator of timing pulses. It is of utility in metering the closed times of a switch. It also functions as a time delay device, generating an output pulse after the application of power for a predetermined time.

A model of this oscillator was prepared and successfully tested. The component values are indicated below. The device drew 60 microamperes from a 10-volt supply. The period was about 23 seconds for the values stated and varied very slightly with temperature.

In order to complete the description of the invention, a typical cycle of operation is described in detail.

Assuming that the battery 10 has just been placed in circuit, a certain positive voltage is established at the base 11 of transistor 12 by the voltage divider (13, 14, and resistive elements within the dashed outline 15, which constitutes an equivalent resistor), this voltage divider being disposed between the positive terminal of battery 10 and its grounded negative of reference potential terminal. Since under the assumed conditions the capacitor 16 is uncharged, the initial voltage on the emitter of transistor 12 is zero, from which it follows that the emitter-base junction of transistor 12 is initially biased into non-conductivity—i.e., reverse-biased. Now, the current flow in this voltage divider is insufficient to turn on transistor 17. The assumed connection of the battery 10 in circuit causes a current to flow through resistor 18 to charge capacitor 16, so that the emitter of transistor 12 becomes progressively more positive. The result is that transistor 12 becomes conductive, raising the voltage on the base of transistor 17. When the last-mentioned voltage is greater than the forward voltage drop of the emitter-base junction of transistor 17, that junction begins to conduct, lowering the voltage on the base of transistor 12 so that transistor 12 increases in conductivity. This action is cumulative, so that both transistors are rapidly turned on by the regenerative process just described. When both transistors are turned on, capacitor 16 discharges through two paths. One of the paths comprises the emitter-base junction of transistor 12, the collector-emitter circuit of transistor 17, and the capacitor 16. The other primary path comprises the emitter-collector circuit of transistor 12, the base-emitter junction of transistor 17, and the capacitor 16.

When capacitor 16 is discharged, the emitter-base current bias through each transistor is insufficient to hold it on, so that the transistors quickly turn off, again with cumulative or regenerative action. The circuit returns to the conditions originally assumed, and the above-described cycle of operation is repeated.

As an alternative, it is practical to return resistor 14 directly to ground, in which case the equivalent resistor 15 is not utilized as a part of the voltage divider network. Either polarity can be selected as ground or reference potential by interchanging the types of transistors. In the specific embodiment herein shown, transistor 12 is of PNP type and transistor 17 is of NPN type.

The equivalent resistor 15, comprising the elements 19, 20, and 21, provides a bypass for the emitter-base junction of transistor 17, as required for purposes of stability. The thermistor 21 provides for temperature compensation.

The output can be taken from any one of a number of points. In the embodiment herein shown, the load is preferably connected in series with capacitor 16.

While the parameters herein mentioned are furnished by way of illustration and not of limitation, they were found to be satisfactory in one operable embodiment of the invention:

| | | |
|---|---|---|
| Resistor 18 | ohms | 150,000 |
| Resistor 13 | do | 120,000 |
| Resistor 14 | do | 270,000 |
| Resistor 19 | do | 10,000 |
| Resistor 20 | do | 33,000 |
| Thermistor 21 | | Type 1500 |
| Transistor 17 | | Type 2N343 |
| Transistor 12 | | Type 2N2605 |
| Battery 10 | volts | 10 |
| Capacitor 16 | microfarads | 40 |

While there has been shown and described what is at present considered to be the preferred embodiment of the invention, it will be understood by those skilled in the art that various changes and modifications may be made therein without departing from the scope of the invention as defined by the appended claims.

I claim:

1. In combination:

a source of current having high and reference potential terminals;

a voltage divider comprising a series chain of resistances connected to said terminals and providing two taps;

a first transistor having a first emitter, a first base, and a first collector, said first transistor being connected in the common-emitter configuration and being of one conductivity type;

a second transistor having a second emitter, a second base, and a second collector, said second transistor being of the conductivity type opposite to that of the first;

and a resistance-capacitance energy storage circuit coupled to said source, said second emitter being connected to said capacitor and said first and second bases being connected to the taps on said divider, to provide a threshold and to keep said second transistor non-conductive by reverse bias until a predetermined charge is attained on said capacitor, and the collector of the first transistor being connected to the base of the second transistor, and the collector of the second transistor being connected to the base of the first, so that each transistor is in regenerative relation to the other, said series chain including resistance means connected between said first base and said first emitter for stabilizing said first transistor.

2. The combination in accordance with claim 1 in which the last-mentioned resistance means is included in said series chain.

3. The combination in accordance with claim 1 in which said resistance means comprises branches, of which one branch is a thermistor.

4. The combination in accordance with claim 1 in which the first and second transistors are of type NPN and PNP, respectively.

References Cited

UNITED STATES PATENTS

| | | | |
|---|---|---|---|
| 2,890,353 | 6/1959 | Van Overbeek et al. | 331—111 X |
| 3,101,454 | 8/1963 | Gossland | 331—109 X |

OTHER REFERENCES

Morris: "Experimental Thyristor Control Circuits," Wireless World, August 1965, pp. 396–399.

NATHAN KAUFMAN, *Acting Primary Examiner.*

ROY LAKE, *Examiner.*

S. H. GRIMM, *Assistant Examiner.*